United States Patent [19]
Nakano

[11] Patent Number: 4,797,849
[45] Date of Patent: Jan. 10, 1989

[54] PIPELINED VECTOR DIVIDE APPARATUS
[75] Inventor: Hiraku Nakano, Hadano, Japan
[73] Assignee: Hitachi, Ltd., Tokyo, Japan
[21] Appl. No.: 929,913
[22] Filed: Nov. 13, 1986
[30] Foreign Application Priority Data Nov. 19, 1985 [JP] Japan .................................. 60-259448

[51] Int. Cl.⁴ ............................................... G06F 7/52
[52] U.S. Cl. ..................................................... 364/765
[58] Field of Search ................................ 364/765, 736

[56] References Cited
U.S. PATENT DOCUMENTS

| | | | |
|---|---|---|---|
| 3,508,038 | 4/1970 | Goldschmidt et al. | 364/765 |
| 3,900,723 | 8/1975 | Bethany | 364/736 |
| 4,488,247 | 12/1984 | Inagami et al. | 364/765 |
| 4,525,796 | 6/1985 | Omoda et al. | 364/730 |
| 4,707,798 | 11/1987 | Nakano | 364/765 |

FOREIGN PATENT DOCUMENTS 172444 10/1982 Japan .
 86671  5/1985 Japan .
142738  7/1985 Japan .

Primary Examiner—David H. Malzahn
Attorney, Agent, or Firm—Antonelli, Terry & Wands

[57] ABSTRACT

In a vector divide apparatus having one or few multipliers, a division between two vectors each comprising a plurality of vector elements is performed. A predetermined number of partial quotients are repetitively calculated for each division between vector elements by using the multiplier. In order not to overlap the division operation between consecutive vector elements during calculation of partial quotients using the multiplier, the period of starting the division between vector elements is shortened whereby the vector divide apparatus can be pipelined.

5 Claims, 7 Drawing Sheets

PIPELINED VECTOR DIVIDE APPARATUS

BACKGROUND OF THE INVENTION

The present invention relates to a vector divide apparatus, and more specifically to a vector divide apparatus for performing a vector division by repetitively solving a partial quotient with a multiplier.

A vector processor operates at high speed using an arithmetic pipeline, but it is not easy to perform a vector division using a pipeline.

A method of performing a vector division using a pipeline has been proposed as described for example in JP-A-No. 57-17244 or JP-A-No. 60-86671, wherein a large number of multipliers and adders are used. With this method, its hardware becomes very large and the vector processor becomes costly, although the speed of a vector division by the processor can be improved.

SUMMARY OF THE INVENTION

An object of the present invention is to provide a vector divide apparatus capable of performing a vector division using a pipeline even if the apparatus is equipped with few multipliers (e.g., one or so).

In a vector divide apparatus wherein a partial quotient of a certain length is calculated at a predetermined period, and partial quotients thus calculated are merged to obtain a desired final quotient, the vector apparatus is divided into a main processing unit, a pre-processing unit and a post-processing unit. The main processing unit as referred to herein includes all circuits for calculating a partial quotient and is used in performing a division between a dividend vector element and a corresponding divisor vector element. The pre-processing unit as referred to herein includes all circuits provided at the preceding stage of the main processing unit, and the post-processing unit as referred to herein includes all circuits provided at the succeeding stage of the main processing unit. In FIG. 1, reference numerals 100, 200 and 300 represent the main processing unit, pre-processing unit and post-processing unit, respectively.

For example, as shown in FIG. 2, the preprocessing unit executes fundamental operations including $A_1$, $A_2$, $A_3$, $A_4$, $A_5$ and $A_6$. The main processing unit is allowed to repetitivelyuse a partial quotient calculation circuit. The main processing unit executes fundamental operations $B_1$, $B_2$, $B_3$, $B_4$, $B_5$ and $B_6$ which correspond to those operations of the pre-processing unit, and since data to be processed is different from that of the preprocessing, references B are used instead of A. The post-processing unit processes fundamental operations $C_1$, $C_2$ and $C_3$. Pipelining vector elements has not been intended heretofore and the process flow has been arranged as shown in FIG. 2, wherein after a divide operation between a pair of i-th vector elements, the next divide operation between a pair of (i+1)-th vector elements starts.

However, by modifying the control circuit of FIG. 1, it becomes possible to introduce pipelining whereby before a divide operation between a pair of i-th vector elements is not completed, the next divide operation between a pair of (i+1)-th vector elements starts. The process flow of a vector divide apparatus using a pipeline is shown in FIG. 3. As particularly shown in FIG. 3, it is possible to perform a vector division using a pipeline if the period of starting a vector division between vector elements is shortened in such a way that use of the circuits in the main processing unit are not overlapped for divide operations between different pairs of vector elements. In particular, as shown in FIG. 3, no overlap operation of the main processing unit occurs even if the period of starting a vector division between vector elements is shortened. The least idle duration in operation is obtained when the start operation $B_1$ of a division between (i+1)-th vector elements follows immediately after the last operation $B_6$ of a division between i-th vector elements.

Therefore, in the case of a vector divide apparatus whose main processing unit has one multiplier for example, the start period for each division between vector elements is determined based on the number of fundamental operations of the main processing unit. By modifying the control circuit, even a vector divide apparatus having only one multiplier can perform a vector division using a pipeline, on condition that a division between vector elements is initiated at a period corresponding to the number of clocks equal to that of the fundamental operations of the main processing unit.

DESCRIPTION OF THE PREFERRED EMBODIMENTS

Figure 1:
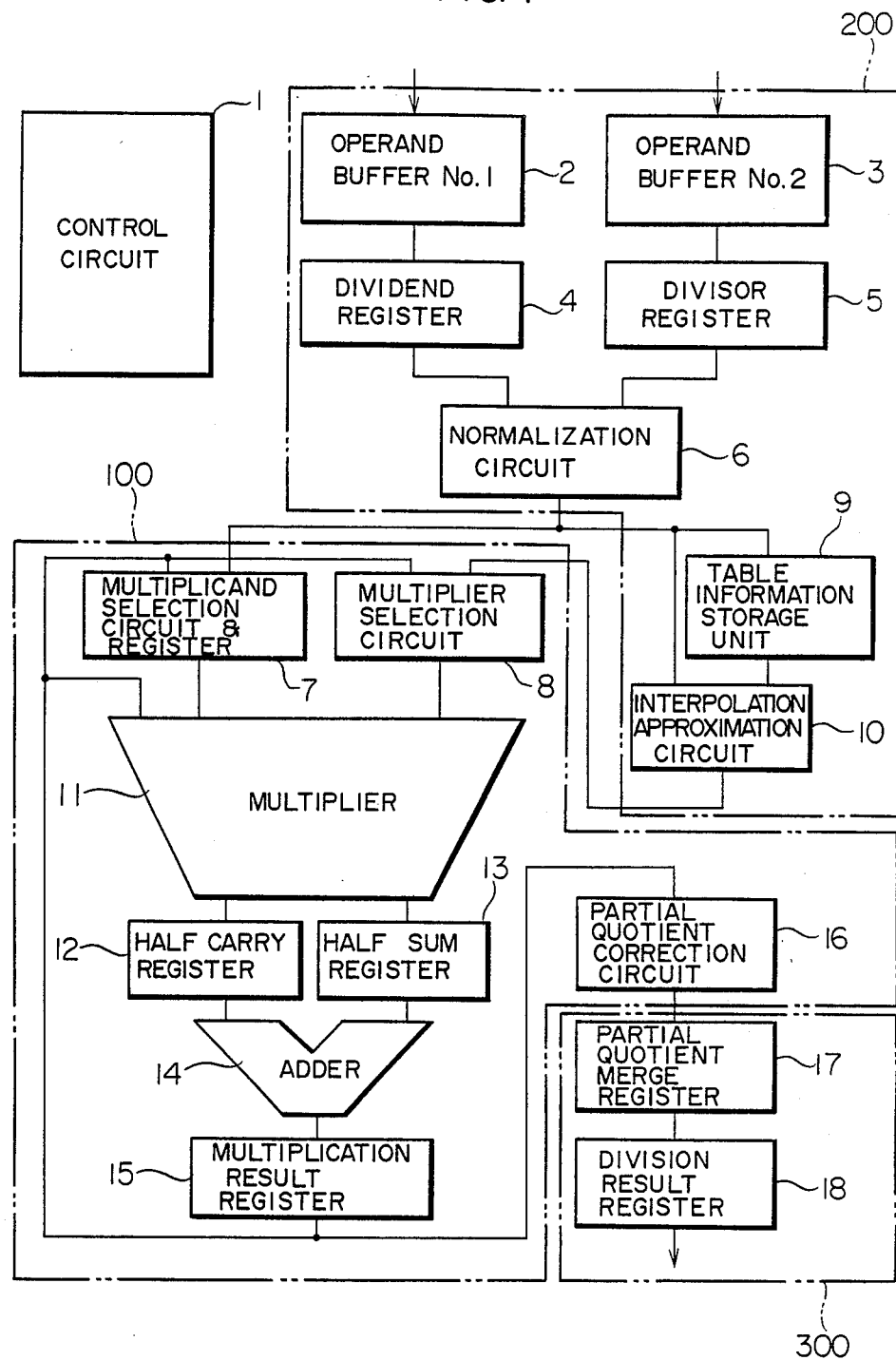
FIG. 1 is a block diagram of an embodiment of a vector divide apparatus according to the present invention.
Figure 2:
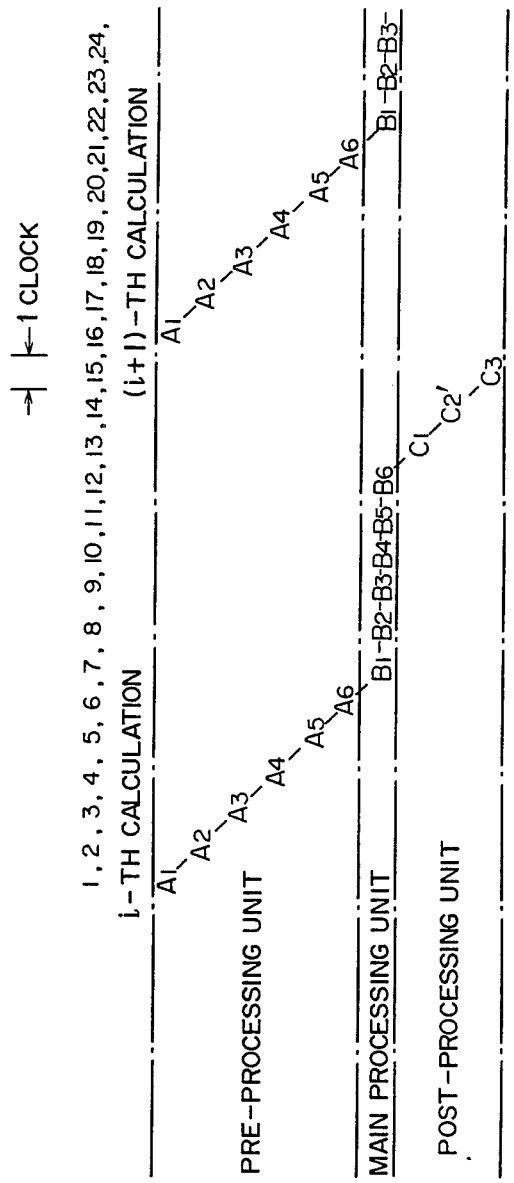
FIGS. 2 and 3 are timing charts for explaining the principle of the present invention.
Figure 3:
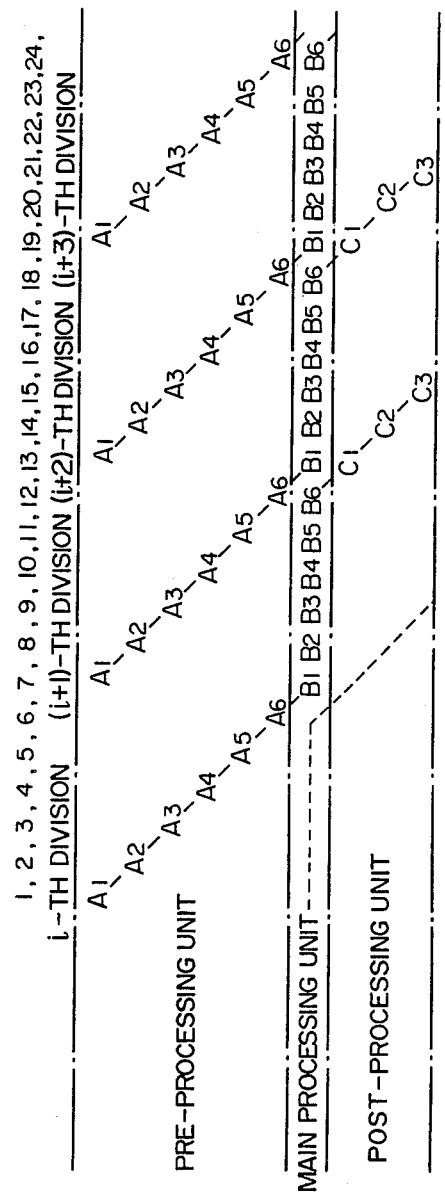

FIG. 1 is a block diagram showing an embodiment of a vector divide apparatus according to the present invention. The construction of the vector divide apparatus shown in FIG. 1 is not so different as that disclosed in JP-A-No. 60-142738 corresponding to U.S. application Ser. No. 687,912 filed on Dec. 31, 1984, now U.S. Pat. No. 4,707,798, and assigned to the same assignee of this application, but the control by the control circuit 1 is remarkably different. The operation of the control circuit 1 will be described later.

Figure 4:
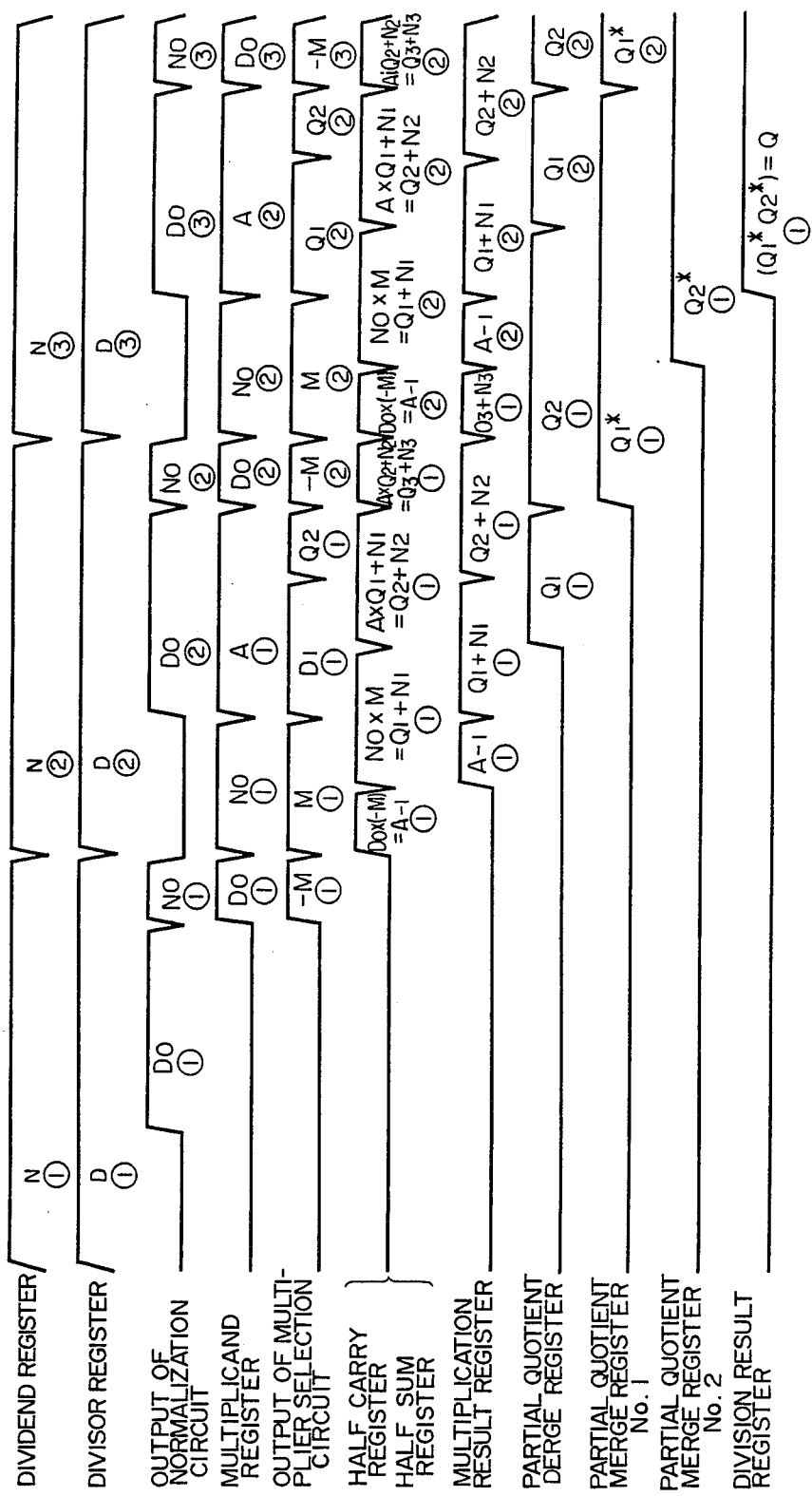
FIGS. 4 and 5 are timing charts for explaining the operation of the vector divide apparatus of FIG. 1.
Figure 5:
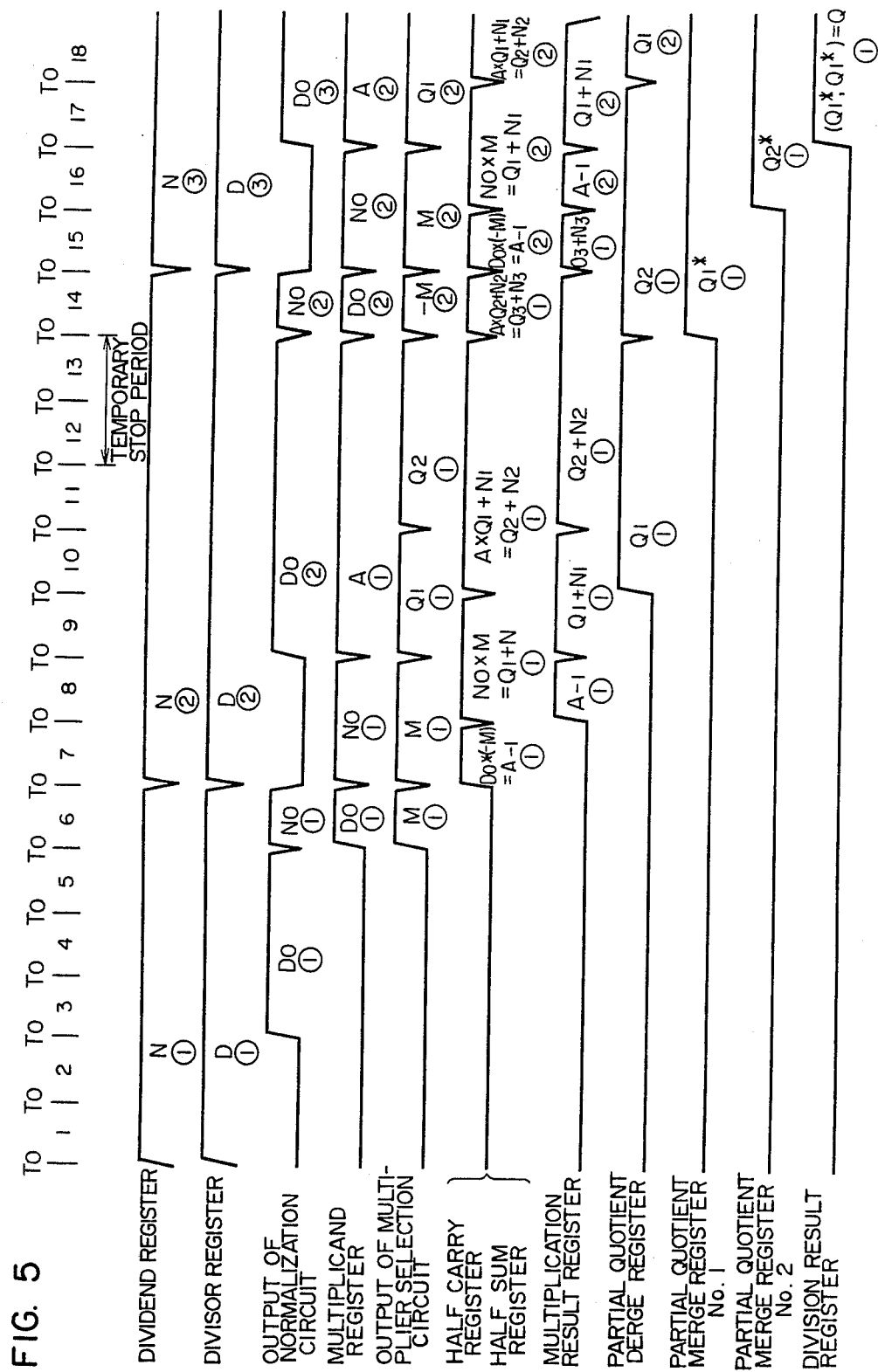

The operation timing chart of the vector divide apparatus shown in FIG. 1 according to the present invention is shown in FIG. 4, while the operation timing chart with a temporary operation stop occurring for two clocks is shown in FIG. 5. As seen from FIG. 5, it is possible even for a pipelined vector divide apparatus to stop its operation temporarily, for example, for two clocks in synchronism with each pipeline stage. In this embodiment, a partial quotient is solved up to 12 bits and a quotient is solved up to 24 bits, respectively, for each division between vector elements. Consequently, the number of calculations of a partial corrected quotient by the main processing unit 100 becomes 2 for each division between vector elements.

Symbols used in FIGS. 4 and 5 have the following meanings. The numeral surrounded by a circle and positioned below each symbol represents an element number.

N: dividend
D: divisor
$N_0$: dividend after normalization $D_o$: divisor after normalization
$M$: approximate reciprocal of $D_o$
$Q_i$: i-th partial quotient
$Q^*_i$: i-th partial quotient after correction
$R_i$: i-th partial remainder where $R_o = N_o$
$N_i$: number obtained by subtracting $Q_i$ from the product of $R_{i-1}$ and M
$A$: number multiplied by Q when $Q_{i+1} + N_{i+1}$, which is M times as large as the i-th partial remainder $R_i$, is calculated from $Q_i$, $N_i$
$Q$: final quotient The procedure for solving a quotient is as in the following. Prior to proceeding with successive iterations, calculations shown by the formulas (1) and (2) are performed.

$$A = 1 - D_o \times M \quad (1)$$

$$Q_1 + N_1 = N_o \times M \quad (2)$$

In the successive iterrations, a partial quotient is solved by the formula (3) and the preceeding one is corrected.

$$Q_i + N_i = A \times Q_{i-1} + N_{i-1} (i \geq 2) \quad (3)$$

Correction of a partial quotient is performed as in the following.

for $Q_{i-1} + N_{i-1} \geq 0$, $Q_i + N_i \geq 0$, $Q_{i-1}^* = Q_{i-1}$ (4)

for $Q_{i-1} + N_{i-1} \geq 0$, $Q_i + N_i < 0$, $Q_{i-1}^* = Q_{i-1} 31\ 1$ (5)

for $Q_{i-1} + N_{i-1} < 0$, $Q_i + N_i \geq 0$, $Q_{i-1}^* = Q_{i-1} + 1$ (6)

for $Q_{i-1} + N_{i-1} < 0$, $Q_i + N_i < 0$, $Q_{i-1}^* = Q_{i-1}$ (7)

wherein $-1$ of the formula (5) and $+1$ of the formula (6) have the same digit as the lowest digit of $Q_{i-1}$ during each successive iteration.

In solving a quotient by a vector divide apparatus having only one multiplier as shown in FIG. 1 and incorporating a pipeline, it is necessary to pay attention to collision or passing with respect to vector element data. The operation of the pipelined vector divide apparatus will now be described with reference to the timing chart of FIG. 4.

A vector division is performed in the following order under control of the control circuit 1 shown in FIG. 1. The control circuit 1 is connected to various circuit elements of FIG. 1 as will be described later, however, in order not to make the block diagram complicated, connections therebetween are omitted. The control circuit 1 controls a divider and requests a storage (not shown), prior to performing a division, to send operands to an operand buffer 2 and an operand buffer 3 so that the divider will have no idle time waiting for data. After the operands are loaded in the operand buffers 2 and 3, the control circuit 1 controls, prior to performing a division, a selection of operands corresponding to a vector element number among those the data loaded in the operand buffers 2 and 3, and to supply the selected operands to a dividend register 4 and a divisor register 5, respectively. Further the control circuit 1 requests the storage to store a division result after completion of a division operation for respective vector elements.

Figure 7:
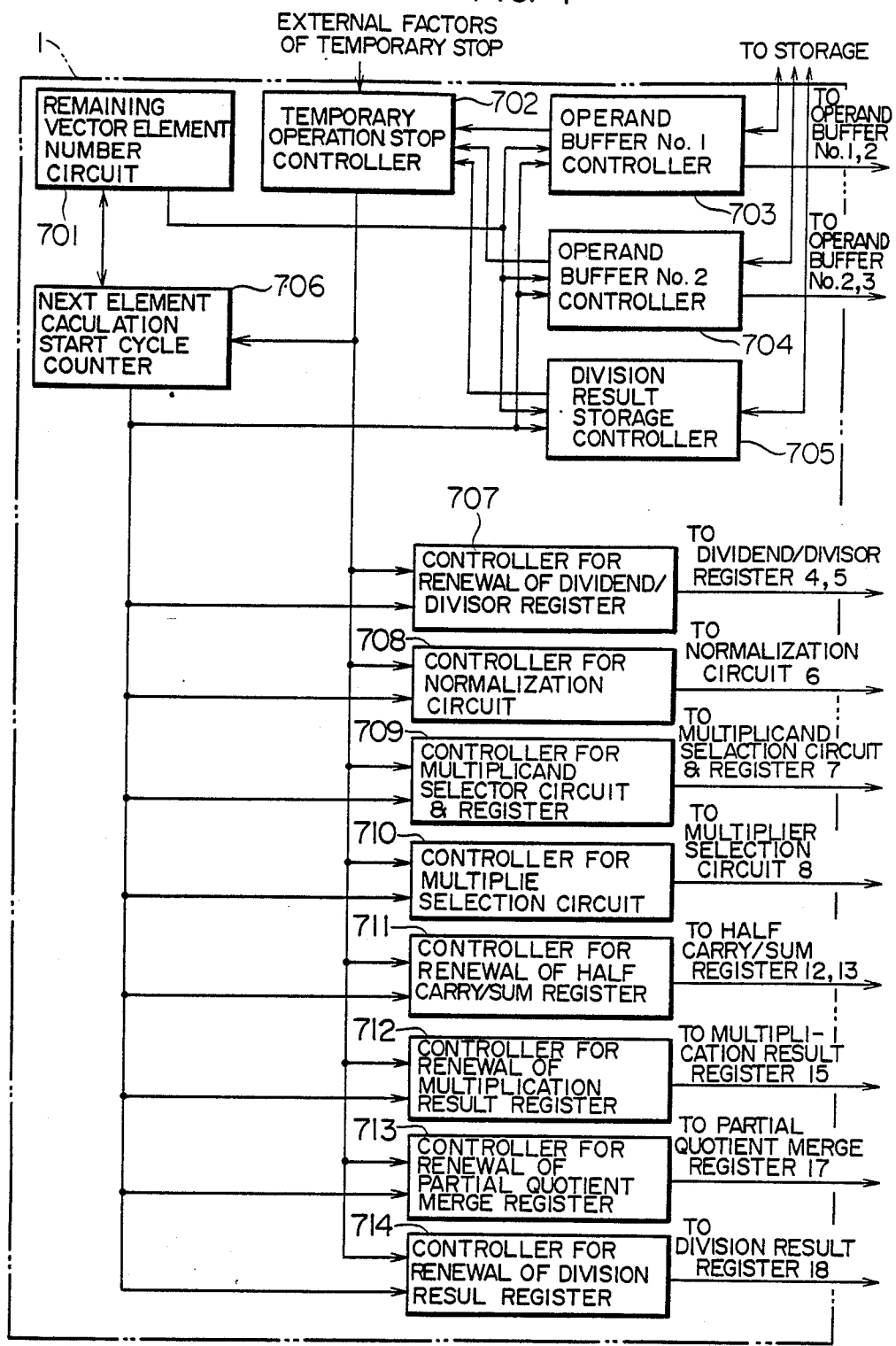
FIG. 7 is a block diagram showing the control circuit of FIG. 1.

A more detailed description of the operation of the control circuit 1 will be given with reference to FIG. 7 which shows the internal circuit arrangement of the control circuit 1. A remaining vector element number counter 701 counts the number of remaining vector elements which are still not calculated. A temporary operation stop controller 702 detects a temporary stop factor, such as an external temporary stop factor, a factor that an operand is not loaded, a factor that a division result is not still stored, and temporarily stops the operation of the divide apparatus or re-starts it. An operand buffer No. 1 controller 703 and an operand buffer No. 2 controller 704 both control the storage to send operands to the operand buffers, control to load the operands in the operand buffers, and control prior to performing a division to read operands corresponding to a vector element number to be processed. A division result storage controller 705 requests the storage to store a division result after a division between respective vector elements. A next element calculation start cycle counter 706 counts the number of cycles from when a calculation for a vector element starts to when the next calculation for another vector element starts, and also has information on the progress of a division operation. A controller 707 for renewal of a dividend/divisor register operates to set the operands read from the operand buffers into the dividend register 4 and the divisor register 5 shown in FIG. 1. Controllers 708 to 714 shown in FIG. 7 control corresponding circuits of FIG. 1 connected to the controllers 708 to 714, respectively.

Referring back to FIG. 1, the operation of the pipelined vector divide apparatus will be described in connection with the timing chart of FIG. 4. Divisor D ① set to the divisor resistor 5 is normalized by a normalization circuit 6. An approximate reciprocal and a difference are read from a table information storage unit 9 using the upper bits of the normalized divisor $D_o$ 1 which is set to a multiplicand selection circuit & register 7.

After improving the precision of the approximate reciprocal by an interpolation approximation circuit 10, first $-M$ is outputted therefrom to select it by a multiplier selection circuit 8 and the formula (1) $D_o \times (-M)$ is calculated by the multiplier 11. In this case, a half carry and a half sum are set into registers 12 and 13, respectively, and simultaneously therewith, vector elements 2 are set to the dividend register 4 and the divisor register 5. As apparent from FIG. 4, calculation of vector elements ② is executed 6 clocks after the start of calculation of vector elements ①. It is to be noted that 6 clocks coincide with the number of operation clocks of all circuits (e.g., a multiplication result register 15) in the main processing unit for example. Namely, if the number of operation clocks of the main processing unit is 8 clocks, then calculation of vector elements ② will be executed 8 clocks after the start of calculation of vector elements ①.

The half carry and half sum solved from the formula $D \times (-M)$ are added together by an adder 14 and the product is set into a multiplication result register 15.

Next, after divisor N ① set into the divisor register 4 is normalized by the normalization circuit 6, the normalized divisor $N_o$ is set into the multiplicand selection circuit & register 7. M is outputted from the interpolation approximation circuit 10 to select it by the multiplier selection circuit 8 and the formula (2) $N_o \times M$ is calculated. The time when $N_o$ ① is set into the dividend register 7 and the time when N ② is set into the dividend register 4 are the same so that data destruction of dividend $N_o$ ① due to collision or passing between vector elements is avoided. The product $N_o \times M$ is set into the half carry register 12 and the half sum register 13 and simultaneously therewith, $D_o \times (-M)$ is set into the multiplication result register 15, and thereafter set into the multiplicand selection circuit & register 7. In the formula (1), 1 is added to $D_o \times (-M)$. After addition of 1, the digits higher than $2^{-13}$ have a negative sign so that the divide apparatus uses A, i.e., those digits lower than $2^{-12}$ as a multiplicand. A is set into the multiplicand register 7 and the product $N_o \times M$ is set into the multiplication result register 15.

Thereafter, the successive iteration of the formula (3) is performed two times and simultaneously therewith, partial quotient correction by the formulas (4) to (7) is performed by a partial quotient correction circuit 15. The corrected partial quotients are set into partial quotient registers Nos. 1 and 2 of a partial quotient merge register 17, 12 bits at a time. After 24 bits are collected, those bits are set into a division result register 18 as a final quotient.

In the foregoing description, a general operation of a vector division can be understood by replacing 1 with i and 2 with (i+1) where i=1, 2, 3, ...

In successive iterations, the upper partial quotient $Q_{i-1}$ of a multiplication result is selected by the multiplier selection circuit 8, and the lower $N_{i-1}$ of the multiplication result is inputted to the multiplier 11 as a multiple to add a result to $A \times Q_{i-1}$. In the calculations by the formulas (1) and (2) except the successive iterations, $N_{i-1}$ is inhibited to be inputted to the multiplier 11 by the control circuit 1.

FIG. 5 is a timing chart wherein the operation is temporarily stopped at cycles 12 and 13, and the control circuit 1 operates to resume an ordinary operation of registers, delaying by 2 clocks the update of each register. This stop in the operation is effected by freezing the operation of the controllers 706 to 714 for 2 clocks by means of the temporary operation stop controller 702.

Figure 6:
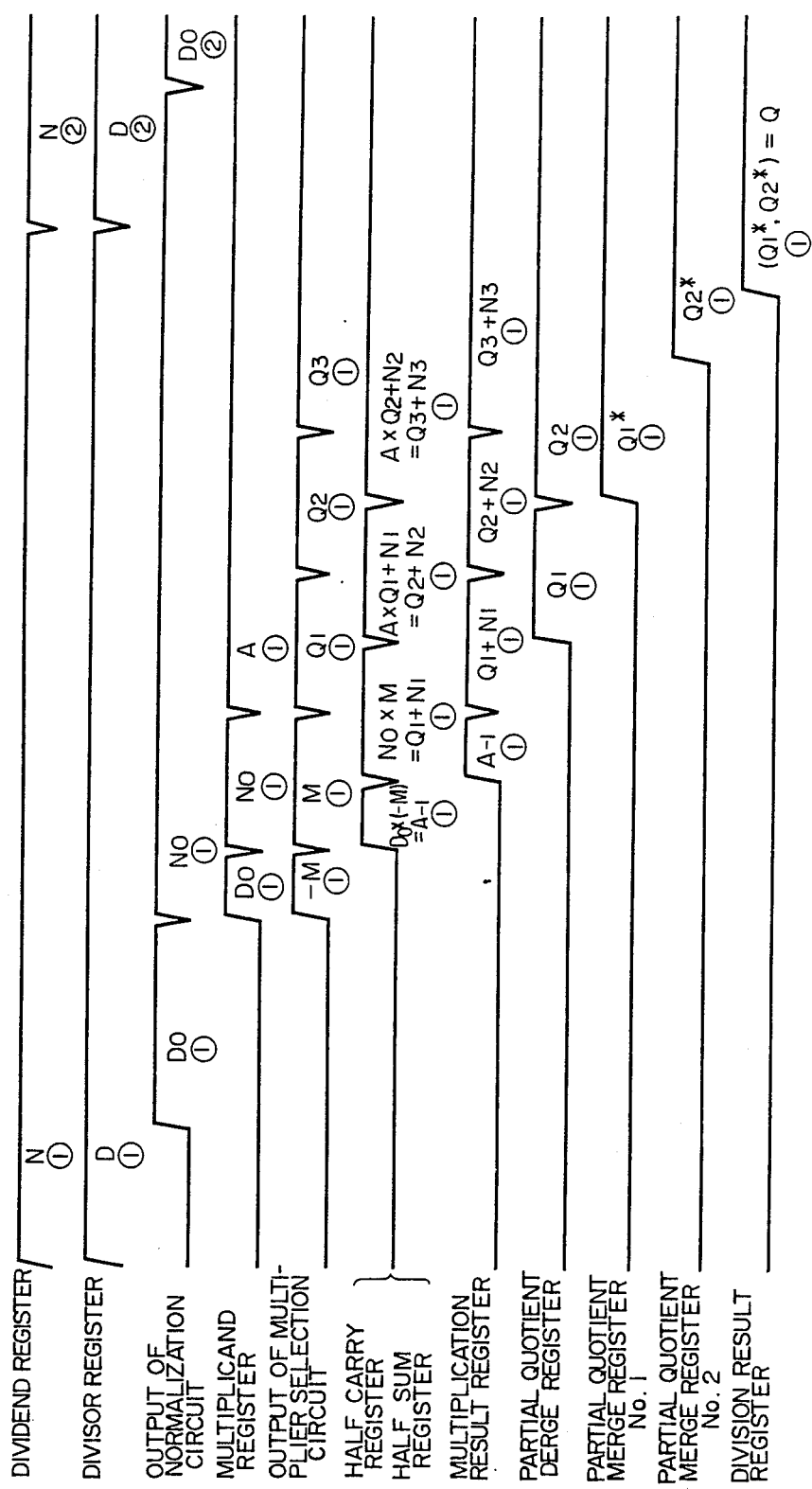
FIG. 6 is a timing chart according to the prior art.

FIG. 6 shows the operation without pipelining, contrary to the cases shown in FIGS. 4 and 5. In case of FIG. 6, after a quotient for vector element ① is solved, vector elements ② are set into the dividend register 4 and the divisor register 5 serving as an input register for the divide apparatus. Therefore, there is no need at all of considering data collision or passing between vector elements. However, in this case, the period of starting a division between vector elements becomes longer than that of the present invention.

As seen from FIGS. 4 to 6, the period of starting a division between vector elements becomes 6 clocks when the present invention is applied, whereas when the present invention is not applied, the period becomes 15 clocks, thus the performance of the apparatus is improved by 2.5 times.

Although the apparatus of the embodiment has used interpolation approximation, the present invention is also applicable to those divide apparatus which calculate a partial quotient of a certain length at a predetermined period and partial quotients are merged to obtain a quotient of a desired length.

According to the present invention, a vector division can be performed using a pipeline without increasing the scale of hardware of multipliers, adders and the like of the vector processor.

I claim:

1. A vector divide apparatus comprising:
    pre-processing means including a dividend register for sequentially storing each vector element of a dividend, a divider register for sequentially storing each vector element of a divisor, and a normalization circuit connected to said dividend register and divisor register for normalizing either a vector element in said dividend register or a vector element in said divisor register;
    main processing means connected to said pre-processing means for obtaining a quotient vector element, including at least one multiplier for calculating a partial quotient of a predetermined bit length for each of a predetermined number of vector elements sequentially from a high order through iterative calculations;
    post-processing means connected to said main processing means for merging a plurality of the partial quotients obtained through said iterative calculations by said main processing means so as to obtain a quotient vector element of a desired bit length as a result of the divide operation between said dividend vector element and said divisor vector element; and
    control means, connected to said pre-processing means, main processing means and post-processing means, for controlling said main processing means so as to prevent an idle duration in the operation of said multiplier in such a manner that the multiplications for (i+1)-th vector elements follow immediately after the multiplication for obtaining final partial quotient i-th vector elements, and for controlling said pre-processing means and said post-processing so that said pre-processing means and post-processing means are operated at a time interval equal to the total time elapsed during said iterative calculations performed by said main processing means to obtain a quotient vector element, in such a manner that an (i+1)-th dividend vector element and an (i+1)-th divisor vector element are input to said pre-processing means before an i-th quotient vector element is outputting from said post-processing means.

2. A vector divide apparatus according to claim 1, wherein said pre-processing means further includes an interpolation approximation circuit connected to said normalization circuit.

3. A vector divide apparatus according to claim 2, wherein said main processing means further includes:
    a dividend selection circuit and a register whose input is coupled to said normalization circuit and whose output is coupled to said multiplier;
    a multiplier selection circuit whose input is coupled to said interpolation approximation circuit and whose output is coupled to said multipler;
    a half sum register coupled to an output of said multiplier;
    a half carry register coupled to an output of said multiplier;
    an adder connected to said half sum register and said half carry register; and
    a multiplication result register for storing a partial quotient outputted from said adder, whose input is coupled to said adder and whose output is coupled to said multiplier, said dividend selection circuit and said register, and said multiplier selection circuit.

4. A vector divide apparatus according to claim 3, wherein said main processing means further includes a partial quotient correction circuit connected to said multiplication result register, for correcting said partial quotient.

5. A vector divide apparatus comprising:

pre-processing means including a dividend register for sequentially storing each vector element of a dividend, a divisor register for sequentially storing each vector element of a divisor, and a normalization circuit connected to said dividend register and divisor register for normalizing either a vector element in said dividend register or a vector element in said divisor register;

main processing means connected to said pre-processing means for obtaining a quotient vector element, including means for predicting a partial quotient of a predetermined bit length for each of a predetermined number of vector elements sequentially from a high order through iterative calculations using a partial remainder, the initial value of which is a dividend vector element after said normalization and a divisor vector element after said normalization, and means for subtracting a product of the dividend vector element after said normalization and said predicted partial quotient from said partial remainder to calculate a partial remainder in iterative calculations;

post-processing means connected to said main processing means for merging a plurality of the partial quotients obtained through said iterative calculations by said main processing means thereby to obtain a quotient vector element of a desired bit length as a result of the divide operation between said dividend vector element and said divisor vector element; and control means, connected to said pre-processing means, main processing means and post-processing means, for controlling said main processing means so as to prevent an idle duration in the iterative calculations in such a manner that the iterative calculations for (i+1)-th vector elements follow immediately after a final iterative calculation for i-th vector elements, and for controlling said pre-processing means and said post-processing means so that said pre-processing means and post-processing means are operated at a time interval equal to the total time elapsed during said iterative calculations performed by said main processing means to obtain a quotient vector element, in such a manner that an (i+1)-th dividend vector element and an (i+1)-th divisor vector element are input to said pre-processing means before an i-th quotient vector element is outputted from said post-processing means.

* * * * *